US008224735B1

(12) United States Patent
Bold et al.

(10) Patent No.: US 8,224,735 B1
(45) Date of Patent: Jul. 17, 2012

(54) METHOD, SYSTEM, AND COMPUTER PROGRAM FOR INVESTING

(75) Inventors: Adam Bold, Overland Park, KS (US); Stacey Schreft, Overland Park, KS (US)

(73) Assignee: The Mutual Fund Store-Kansas City, LLC, Overland Park, KS (US)

( * ) Notice: Subject to any disclaimer, the term of this patent is extended or adjusted under 35 U.S.C. 154(b) by 240 days.

(21) Appl. No.: 12/693,996

(22) Filed: Jan. 26, 2010

(51) Int. Cl.
*G06Q 40/00* (2012.01)
(52) U.S. Cl. ............... 705/36 R; 705/35; 705/37
(58) Field of Classification Search .............. 705/35, 705/36 R, 37
See application file for complete search history.

(56) References Cited

U.S. PATENT DOCUMENTS

2005/0283419 A1 * 12/2005 Schaub .................. 705/35
* cited by examiner

*Primary Examiner* — Daniel Felten
(74) *Attorney, Agent, or Firm* — Hovey Williams LLP

(57) ABSTRACT

An investment method provides a predictable monthly income to a retiree or other investor while increasing asset growth potential and decreasing the likelihood that assets will need to be sold during market downturns. The method may be implemented by computer equipment and computer programs operated by an investment services provider. Funds are first received from an investor and used to purchase assets for a Growth Component and an Income Protection Component. The assets in the Growth Component are invested primarily in growth-oriented investments, and the assets in the Income Protection Component are invested primarily in income-oriented investments. The investor may be paid distributions from the Income Protection Component. As the Income Protection Component is depleted through the payment of the distributions, it is periodically replenished by selling assets from the Growth Component. To minimize the likelihood that assets will be sold from the Growth Component during down markets, the amount of assets sold from the Growth Component is based at least partially on the rate of return of the Growth Component and may also be based on the state of the Income Protection Component.

9 Claims, 3 Drawing Sheets

METHOD, SYSTEM, AND COMPUTER PROGRAM FOR INVESTING

BACKGROUND

The present invention relates to methods, systems, and computer programs for investing.

U.S. and foreign stock markets have historically trended upward over long time periods but have experienced many declines, some significant, over shorter time periods. Investors who do not need to sell assets can usually weather these downturns, but retirees and others who rely on savings for living expenses and emergencies are often forced to sell investment assets during down markets. Selling investment assets when markets are low is of course undesirable because fewer assets remain to benefit from future market recoveries. Thus, many investment advisors recommend that retirees and other similarly situated investors minimize their exposure to equities, especially higher risk ones.

Annuities, bond funds, money market funds, bank certificates of deposit, and similar investments are typically less volatile than stocks and provide relatively predictable income streams, so they are often recommended for retirees and other similarly situated investors. However, such investments often do not provide enough growth potential to keep up with inflation and increased income needs, especially for people who may need to live on their investments for many years.

SUMMARY

The present invention solves the above-described problems and provides a distinct advance in investing. More particularly, investment methods described herein provide predictable monthly income payments or other distributions to retirees or other investors while increasing asset growth potential and decreasing the likelihood that assets will need to be sold during market downturns.

One embodiment of the invention is a method that may be implemented by computer equipment and computer programs operated or administered by an investment services provider, broker, analyst, or any other person or entity that provides investment services to investors. An investor or other customer first deposits funds into an account managed or otherwise controlled by a custodian or other entity. These funds are then used to purchase assets, and the assets are allocated between an Income Protection Component and a Growth Component. In one embodiment, the assets in the Growth Component are invested primarily in growth-oriented investments such as mutual funds that invest in domestic and foreign stocks, bonds, and/or other securities, and the assets in the Income Protection Component are invested primarily in individual fixed-income assets (such as FDIC-issued bank certificates of deposit, corporate and/or municipal bonds, direct obligations of the U.S. government, etc.), money market mutual funds, and/or other income-oriented investments. However, the particular investments in the Growth Component and Income Protection Component can vary, and the asset types in the two components can even overlap somewhat as long as the investments in the Growth Component are generally more growth-oriented than the investments in the Income Protection Component.

The investor may be paid monthly distributions or other periodic payments from the Income Protection Component. These distributions may be fixed, adjusted for inflation, increased, or decreased as desired by the investor. The investor may also elect to receive occasional non-periodic distributions or withdrawals or may even choose to forgo some or all of the distributions entirely.

As the Income Protection Component is depleted through the payment of the distributions, it is periodically replenished by selling assets from the Growth Component. To minimize the likelihood that assets will be sold from the Growth Component during down markets, the amount of assets sold from the Growth Component to replenish the Income Protection Component is based at least partially on the rate of return of the Growth Component. For example, during periods of high rates of return in the Growth Component, more assets are sold from the Growth Component, and during periods of low or negative rates of return in the Growth Component, fewer or no assets are sold from the Growth Component.

In some embodiments, the state of the Income Protection Component is also monitored and considered when determining how much, if any, assets should be sold from the Growth Component to replenish the Income Protection Component. The "state" of the Income Protection Component may be measured in several different ways, for example, by determining the value of the assets remaining in the Income Protection Component, the rate of return of the assets in the Income Protection Component, or the size of the Income Protection Component as measured in the number of steps in an investment ladder held by the Income Protection Component.

For the embodiment in which the state of the Income Protection Component is measured by the number of steps remaining in an investment ladder, the Income Protection Component may be initially funded with a selected number of steps needed to fund a desired number of distributions. For example, the Income Protection Component may be funded with an investment ladder with 10 steps, where each step can cover 6 months worth of distributions, so that the Income Protection Component can initially cover 60 distributions. The state of the Income Protection Component is then monitored and replenished if necessary so that it always has at least one step in its investment ladder (and therefore has at least 6 months worth of distributions) and no more than ten steps. It should be noted that to maintain at least one step in the Income Protection Component, it must actually have two or more steps after being replenished so that it will still have at least one step at all times before the next replenishing period. For example, if during monitoring the Income Protection Component is found to have fallen to fewer than two steps, it is replenished through the addition of at least one more step so it will have at least two steps before the next distribution and will not fall below one step before the next replenishing period. The rate of return of the Growth Component is also monitored to determine if more steps than just those necessary to reach the minimum step size should be added to the Income Protection Components. For example, if the rate of return of the Growth Component is high, more assets are sold from the Growth Component to purchase more steps in the investment ladder, up to the maximum number of steps. Conversely, if the rate of return of the Growth Component is low or negative, fewer or no assets are sold from the Growth Component, as long as the number of remaining steps in the Income Protection Component always remains at or above the minimum number of steps.

Particular embodiments of the invention described below implement rules or algorithms for triggering when, and to what extent, assets are sold from the Growth Component to purchase assets for the Income Protection Component.

The above-described embodiments and other possible embodiments of the invention provide an investor a regular and predicable income stream while maximizing the potential for asset growth by investing a portion of the investor's assets in a relatively conservative Income Protection Component for paying monthly or other periodic distributions and a portion in a relatively more aggressive Growth Component for possible asset growth. Because more assets from the Growth Component are sold when its rate of return is high and fewer or no assets are sold when its rate of return is low or negative, the Growth Component is less likely to become depleted over time. Embodiments of the invention that invest in investment ladders implement a unique flexible fixed-income ladder that grows or shrinks, depending on market conditions and rates of return, with the goal of minimizing the likelihood that assets from the Growth Component will need to be sold at a loss.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of account embodiments and the accompanying drawing figures.

BRIEF DESCRIPTION OF THE DRAWING FIGURES

Embodiments of the present invention are described in detail below with reference to the attached drawing figures, wherein.

Figure 1:
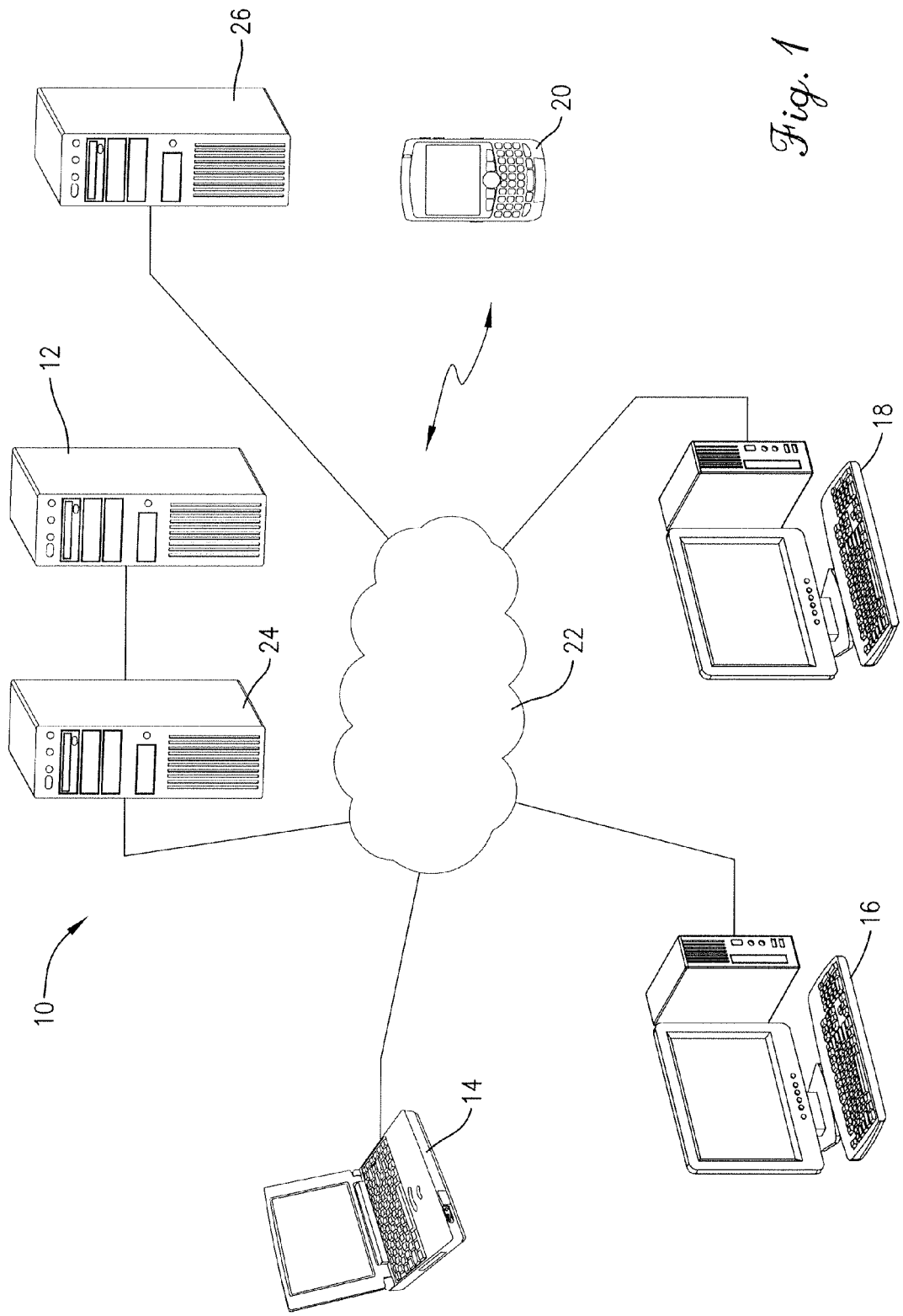
FIG. 1 is a schematic diagram of computer and communication equipment that may be used to implement certain aspects of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In general, the present invention is an investment method that provides predictable distributions or other payments to a retiree or other investor while increasing the likelihood of asset growth and decreasing the likelihood that assets will need to be sold during market downturns. In some embodiments, this is accomplished with a flexible fixed income ladder that grows or shrinks, depending on market conditions and rates of return, with the goal of minimizing the likelihood that assets will need to be sold at a loss to fund the distributions.

One embodiment of the invention is implemented by an investment services provider or any person or entity that provides investment services to investors. An investor or other customer first moves assets in one or more investment accounts to a custodian or other entity. Each account has within it a Growth Component and an Income Protection Component. The investor is paid monthly distributions or other periodic or non-periodic payments from the Income Protection Component. As the Income Protection Component is depleted, its assets are periodically replenished with assets from the Growth Component.

In some embodiments, the amount of assets sold from the Growth Component to replenish the Income Protection Component is based on the rate of return of the Growth Component. For example, when the Growth Component experiences high rates of return, more assets are sold from the Growth Component to replenish the Income Protection Component, and during periods of low, no, or negative rates of return for the Growth Component, fewer or no assets are sold from the Growth Component to replenish the Income Protection Component.

In other embodiments, the amount of assets sold from the Growth Component to replenish the Income Protection Component is based on both the rate of return of the Growth Component and the state of the Income Protection Component. The "state" of the Income Protection Component may be the current value of the assets in the Income Protection Component, the rate of return of the assets in the Income Protection Component, or the current number of steps remaining in an investment ladder held by the Income Protection Component. In these embodiments, more assets are sold from the Growth Component to replenish the Income Protection Component when the rate of return of the Growth Component is high, but only when the state of the Income Protection Component is below some maximum state level (e.g. a maximum value or maximum number of investment ladder steps). Conversely, fewer or no assets are sold from the Growth Component to replenish the Income Protection Component when the rate of return of the Growth Component is low or negative, as long as the state of the Income Protection Component is above some minimum state level (e.g. a minimum value or minimum number of investment ladder steps).

The above-described general principles can be implemented in a variety of ways. In one embodiment, certain aspects of the invention are implemented with one or more computer programs that operate computer equipment broadly referred to by the numeral 10 in FIG. 1. The computer equipment 10 may include a host computer 12 and a number of computing devices 14, 16, 18, 20 that may access the host computer 12 via a communications network 22. The computer programs and computer equipment 10 illustrated and described herein are merely examples of programs and equipment that may be used to implement aspects of the present invention and may be replaced with other programs and computer equipment without departing from the scope of the present invention.

The host computer 12 may be operated by employees or agents of an administrator or provider of investment services such as The Mutual Fund Store®. The host computer serves as a repository for data and programs used to implement certain aspects of the present invention as described in more detail below. The host computer 12 may be any computing device such as a network computer running Windows NT, Novel Netware, Unix, or any other network operating system. The host computer 12 may be a single computer, a number of computers, a server, or even resources on a cloud computing network. The host computer 12 may be connected to a computing device 24 that serves as a firewall to prevent tampering with information stored on or accessible by the host computer 12. The host computer 12 may include conventional web hosting operating software, an Internet connection such as a modem, DSL converter or ISDN converter, and may be assigned a URL and corresponding domain name so that it can be accessed via the Internet or any other communication network in a conventional manner. The host computer 12 may also be in communication with a computer or computer system 26 operated by an investment custodian such as Schwab Institutional, a division of Charles Schwab & Company, Inc.

The computing devices 14-20 may be used by employees or agents of the investment services administrator such as investment advisors, analysts, brokers and others wishing to provide investment services to investors. The computing devices 14-20 may be any types of devices that permit access to the host computer 12 via the communications network 22. For example, the computing devices may include personal, portable, or laptop computers such as those manufactured and sold by Dell, Compaq, or IBM, and/or handheld smart phones or personal assistants such as those manufactured and sold by Apple, Palm, or RIM. Each computing device 14-20 preferably includes or can access a conventional Internet connection such as a modem, DSL converter, or ISDN converter and a web browser or has other communication equipment that permits it to access the host computer via the communications network 22.

The communications network 22 may be any conventional communications network such as a local area network, a wide area network, a wireless network, the Internet, or an intranet. The communications network may also comprise a combination of any of these networks and/or other networks.

The computer programs of the present invention are stored in or on computer-readable medium residing on or accessible by the computer equipment 10 for instructing the computer equipment to perform aspects of the present invention described herein. The computer programs preferably comprise ordered listings of executable instructions for implementing logical functions in the computer equipment. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Figure 2:
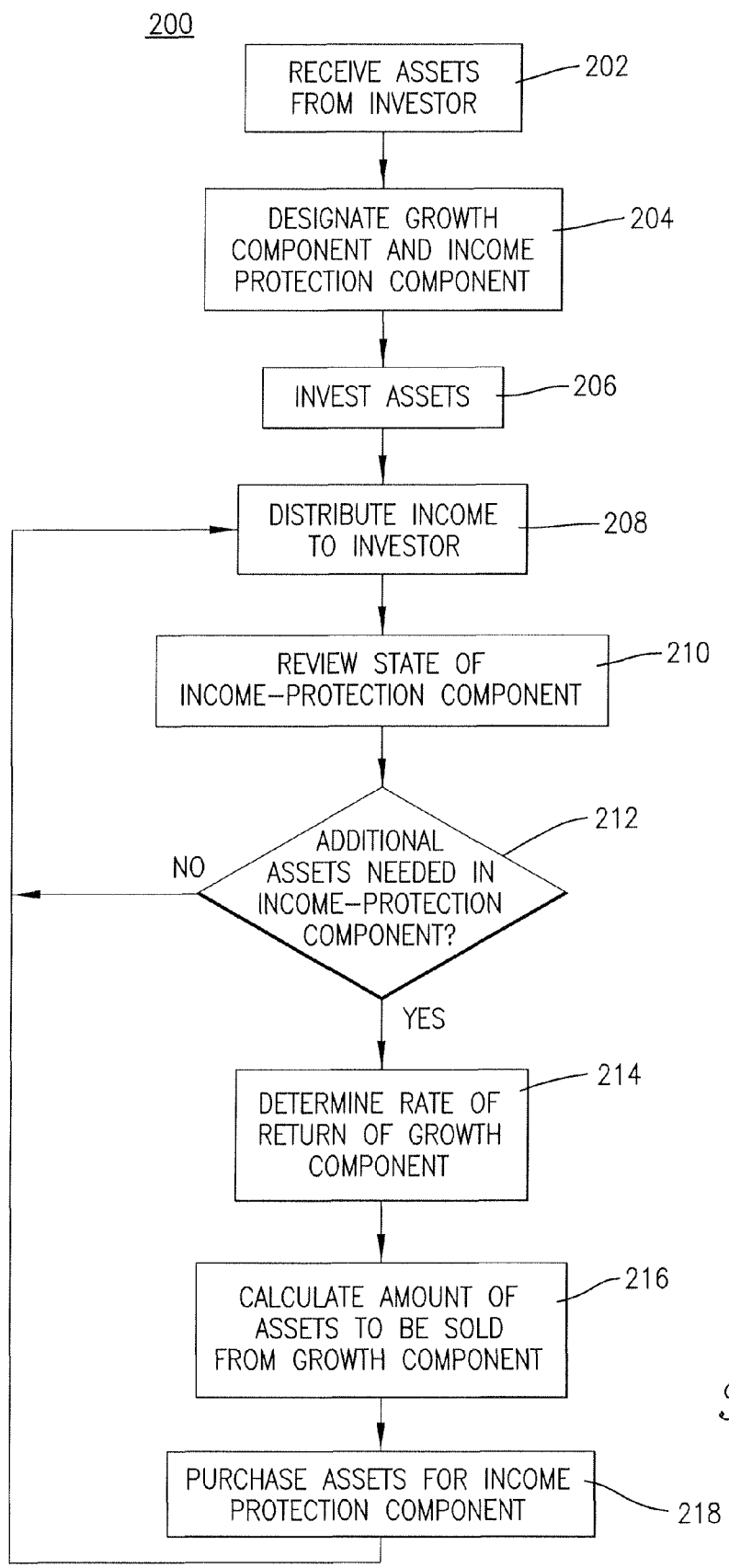
FIG. 2 is a flow diagram depicting steps in an exemplary method of the invention.

The flow chart of FIG. 2 shows the functionality and operation of one embodiment of the present invention in more detail. In this regard, some of the blocks of the flow chart may represent a module segment or portion of code of the computer programs of the present invention which comprise one or more executable instructions for implementing the specified logical function or functions. In some alternative implementations, the functions noted in the various blocks may occur out of the order depicted in FIG. 2. For example, two blocks shown in succession in FIG. 2 may in fact be executed or performed substantially concurrently, or the blocks may sometimes be executed or performed in the reverse order depending upon the functionality involved.

The method depicted in FIG. 2 generally begins when an investor or other customer deposits or otherwise provides funds for an account to be managed or controlled by an investment services provider such as The Mutual Fund Store as depicted in step 202. For example the investor may be advised by the investment services provider to deposit funds into one or more investment accounts at a custodian such as Charles Schwab & Company, Inc. Although not shown or described in detail herein, step 202 may be preceded by the development of an in-depth financial profile for the investor to ensure that the investor's investment time horizon, goals, income requirements, and risk tolerance levels are all suitable for the investment methods of the present invention.

The method then proceeds to step 204 where the funds collected in step 202 are used to purchase assets that are allocated between a Growth Component and an Income Protection Component.

The amount of assets initially invested in each component depends on the investor's income requirements. In one embodiment, the Income Protection Component is initially funded with an investment ladder having a select number of steps where each step can cover a select number of monthly distributions. For example, if an investor desires monthly distributions of $1,000 each, the Income Protection Component may be initially funded with an investment ladder designed to cover 60 months worth or some other selected number of these $1,000 distributions as described in more detail below.

In step 206, the investment services provider or custodian invests the assets in the Growth Component and the Income Protection Component. In one embodiment, the assets in the Growth Component are invested primarily in growth-oriented investments such as mutual funds that invest in domestic and foreign stocks, bonds, and/or other securities, and the assets in the Income Protection Component are invested primarily in individual fixed-income assets (such as FDIC-issued bank certificates of deposit, corporate and/or municipal bonds, direct obligations of the U.S. government, etc.), money market mutual funds, and/or other income-oriented investments. However, the particular investments in the Growth Component and Income Protection Component can vary, and the asset types in the two components can even overlap somewhat as long as the investments in the Growth Component are generally more growth-oriented than the investments in the Income Protection Component.

In step 208, a distribution is paid to the investor from the Income Protection Component. In one embodiment, the distribution is in the form of a monthly or other periodic or non-periodic check or electronic transfer. The distributions may or may not be adjusted for inflation at the discretion of the investor and may be made at any intervals and may be a fixed or variable amount. In still other embodiments, an investor may choose to forgo some or all of the distributions.

In step 210, the state of the assets in the Income Protection Component is reviewed or monitored and the rate of return of the assets in the Growth Component is determined. This may be done automatically with the computer equipment 10 and computer programs described above, or may be done manually or semi-manually by an administrator of the method or an advisor representing the investor. As used herein, "state" may mean the monetary value of the assets in the Income Protection Component, the size of the Income Protection Component as measured in the number of steps in an investment ladder, the rate of return of the assets, or any other measure of performance.

Step 212 then determines whether additional assets are needed in the Income Protection Component. In some embodiments, this may be done by comparing the current state of the Income Protection Component to a maximum state level. For example, if the Income Protection Component was initially funded with an investment ladder where each step in the ladder is sufficient to cover 6 months worth of distributions, the minimum state may be 1 step in the ladder and the maximum state may be 10 steps. If step 212 determines that the current number of steps in the ladder is 10, the method returns to step 208 because no additional steps are permitted in the Income Protection Component. However, if step 212 determines that the current number of steps in the Income Protection Component is less than 10, the method proceeds to step 214 to determine if more assets should be added to the Income Protection Component as described below.

Step 214 then determines the amount of assets to be sold from the Growth Component to replenish the Income Protection Component, if any, based on the rate of return of the Growth Component as determined in step 210 above. Specifically, when the rate of return of the Growth Component is high, more assets are sold from the Growth Component to replenish the Income Protection Component. When the rate of return of the Growth Component is low or negative, fewer or no assets are sold from the Growth Component to replenish the Income Protection Component. More specific examples of this are described below.

In some embodiments, step 214 may also take into account specific rate of return thresholds when determining the amount of assets to sell from the Growth Component. For example, when the rate of return of the Growth Component over a selected amount of time (e.g. 6 months or 12 months) exceeds a threshold rate (e.g. 2.5% or 5%), a selected amount of assets may be transferred. The greater the difference between the rate of return and the threshold, the larger the amount of assets transferred, subject to the maximum size allowed for the Income Protection Component.

In some embodiments, step 214 may also take into account the current state of the Income Protection Component and its maximum and minimum state levels when determining the amount of assets to sell from the Growth Component to replenish the Income Protection Component. For instance, using the exemplary maximum and minimum step sizes discussed above, step 214 may transfer more assets to the Income Protection Component when its current step size is at or near the minimum step value of 1 and fewer or no assets when its current step size is at or near the maximum step size of 10. In some embodiments, at least some assets are transferred to the Income Protection Component when its state drops to the minimum state level, and no assets are transferred when the state of the Income Protection Component reaches its maximum state level, regardless of the rate of return of the Growth Component. More specific embodiments of these calculations are discussed below with reference to FIG. 3.

In step 216 of FIG. 2, the administrator or custodian sells assets from the Growth Component to replenish the Income Protection Component in accordance with the results of step 214. This may be done in any conventional manner. For example, assets from the Growth Component may be sold and the proceeds used to purchase new assets for the Income Protection Component or assets may be transferred from the Growth Component to the Income Protection Component. The method then returns to step 208 to distribute another distribution to the investor at the appropriate time and to repeat the subsequent steps of the method.

Although steps 210, 212, 214, and 216 described above are each shown as a single discrete step in the method, some or all of these steps and possibly other steps are performed periodically (annually, semi-annually, monthly, every day, every hour, etc.) or even continuously.

Figure 3:
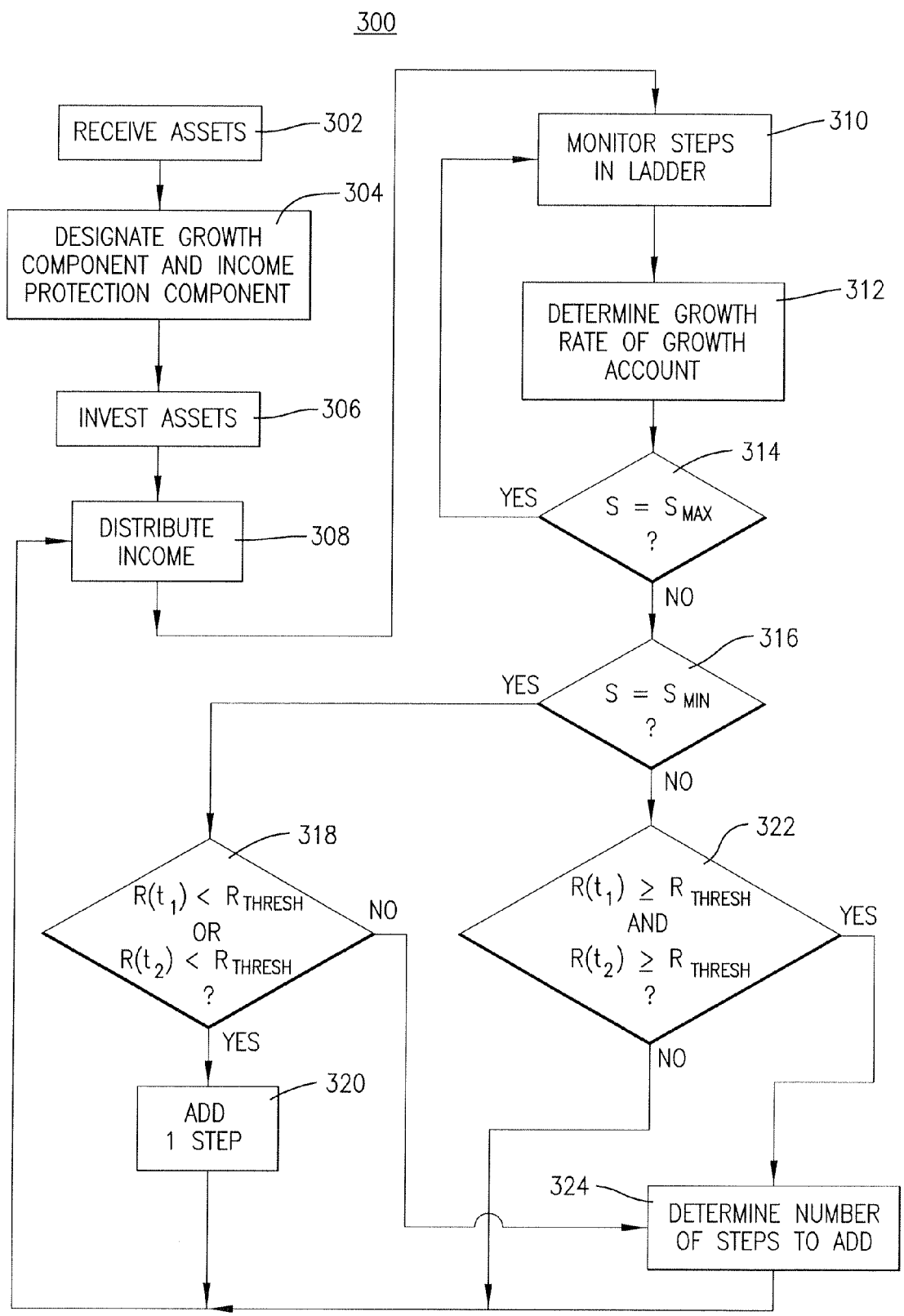
FIG. 3 is a flow diagram depicting steps in another exemplary method of the invention.

The flow chart of FIG. 3 shows the functionality and operation of other embodiments of the invention in more detail. In these embodiments, the sale of assets from the Growth Component for replenishing the Income Protection Component is governed by particular algorithms or rules. However, the exemplary algorithms, rules, thresholds, and other variables discussed in connection with this embodiment may be changed without departing from the scope of the invention. As with FIG. 2, some of the blocks of the flow chart of FIG. 3 may represent a module segment or portion of code of the computer programs of the present invention which comprise one or more executable instructions for implementing the specified logical function or functions. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

Steps 302 and 304 are essentially the same as steps 202 and 204 of FIG. 2 and are therefore not described again.

Step 306 is similar to step 206 except that in step 306 the assets in the Income Protection Component are invested into a number of fixed term securities each having a different maturity date to create an income-producing ladder with a selected number of steps. For example, 6 months worth of distributions may be invested in a money market account to cover the first 6 months of distributions and the remaining assets may be initially invested in fixed securities, one with a 6-month maturity date, another with a 12-month maturity date, another with an 18-month maturity date, another with a 24-month maturity date, another with a 30-month maturity date, another with a 36-month maturity date, another with a 42-month maturity date, another with a 48-month maturity date, and another with a 54-month maturity date to create a 10-step security ladder with 6-month maturity intervals. As each security matures, it is used to fund the next 6 distributions to the investor as described in more detail below. The value of each security purchased depends on the amount of the periodic payments. For example, if the periodic distributions are $1,000 per month, each security may be worth $6,000 so that it covers 6 months worth of distributions.

Step 308 is essentially the same as step 208 of FIG. 2, except that in step 308, the distributions are made from the maturing securities or other investments in the investment ladder. For instance, using the example above, when a $6,000 security matures, it may be used to make the next 6 distributions.

Step 310 then monitors the state of the Income Protection Component, such as the number of steps remaining in the income-producing ladder, and step 312 monitors or determines the rate of return of the Growth Component. As with the related steps 210 and 212 of FIG. 2, these steps may be performed by the computer equipment and computer programs described above or by other means.

Steps 314-324 then determine the amount of assets to sell or otherwise transfer from the Growth Component to replenish the Income Protection Component as distributions are deducted therefrom. In one embodiment, the timing and the amount of the replenishment is governed by rules or algorithms described below, where:

Z=the maturity interval of the Income Protection Component investment ladder (typically 6 months or 1 year, but could be any interval).

S=the current number of steps in the income-producing ladder. If Z=6 months, 1 step S=6 months of distributions.

$S_{MAX}$=the maximum number of steps in the income-producing ladder (10 steps, or 60 months worth of distributions, in one embodiment)

$S_{MIN}$=the minimum number of steps in the income-producing ladder (2 steps, or 12 months worth of distributions in one embodiment)

$R_{(t1)}$=the rate of return of the Growth Component over a time period $t_1$ ($t_1$ is 6 months in one embodiment)

$R_{(t2)}$=the rate of return of the Growth Component over a time period $t_2$ ($t_2$ is 12 months in one embodiment)

$R_{THRESH}$=a threshold rate of return selected by the administrator (2.5% in one embodiment)

Step 314 first determines if $S=S_{MAX}$. If it does, the method returns to step 310 or step 308 because no additional steps are needed in the Income Protection Component. For example, if $S_{MAX}$ is set to 10 (which corresponds to 60 months of distributions) and step 310 determines that the current number of steps in the Income Protection Component is 10, the method returns to step 308 or 310. Otherwise, the method continues to step 316.

Step 316 determines if $S \leq S_{MIN}$. If it is, the method proceeds to step 318. If it does not, the method proceeds to step 322.

Step 318 determines if $R_{(t1)} < R_{THRESH}$ or if $R_{(t2)} < R_{THRESH}$. If either of these is true, the method proceeds to step 320. If neither is true, the method proceeds to step 324.

For example, if $t_1$=6 months and $t_2$=12 months, and the rate of return of the Growth Component over either of these time periods was below $R_{THRESH}$, the method proceeds to step 320. In step 320, assets needed to increase the Income Protection Component to the minimum step size are sold from the Growth Component to replenish the Income Protection Component. This is done to minimize the sale of assets from the Growth Component when its rate of return is low or negative. The method then returns to step 308 to distribute future distributions and to continue monitoring the state of the Income Protection Component and the Growth Component.

It should be noted that even though $S_{MIN}$ is 2 steps in the example described herein, routine distributions will cause the Income Protection Component to fall below 2 steps between replenishing periods. This would be observed during the monitoring process, and the Income Protection Component would be replenished to bring it back to at least 2 steps.

If step 318 determines that the rate of return of the Growth Component over both the two time periods was greater than or equal to $R_{THRESH}$, the method proceeds to step 324 to determine how many steps to purchase for the Income Protection Component as described below.

Step 322 is reached if the answer to step 316 is "no." This step determines if $R_{(t1)} \geq R_{THRESH}$ and $R_{(t2)} \geq R_{THRESH}$. The value for $R_{THRESH}$ may be any rate of return or other performance metric selected by the administrator or anyone else and in one embodiment is 2.5%. In other embodiments, $R_{(t1)}$ and $R_{(t2)}$ may have different $R_{THRESH}$ values, and returns over different time periods (e.g. $t_3$, $t_4$, etc.) could also be considered relative to their designated thresholds. If step 322 determines that either $R_{(t1)}$ or $R_{(t2)}$ is below $R_{THRESH}$, the method adds no steps to the Income Protection Component because the Income Protection Component already has more than the minimum number of steps and it is not desirable to add more due to the low rate of return for the Growth Component. However, if step 322 determines that $R_{(t1)}$ and $R_{(t2)}$ are both greater than or equal to $R_{THRESH}$, the method proceeds to step 324 to determine how many steps should be added to the investment ladder.

Step 324 is reached if the rate of return of the Growth Component is greater or equal to the threshold rate over two time periods and if the investment ladder requires at least one additional step. Step 324 considers both the rate of return of the Growth Component and the state of the Income Protection Component (e.g. number of steps that can be added to the investment ladder) when determining the amount of assets to sell from the Growth Component to replenish the Income Protection Component. In one particular embodiment, step 324 adds steps equal to the minimum of: (1) $S_{MAX}-S$; and (2) the largest integer of $R_{(t1)} \div R_{THRESH}$.

For example, suppose the investment ladder currently has steps in intervals of 6 months (that is, Z=6 months), 2 years of withdrawals in it and therefore four 6-month steps (that is, S=4), the return to the Growth Component over the past 6 months was 10% (that is, $R_{(t1)}$=10%), the return to the Growth Component over the past 12 months was 12% (that is, $R_{(t2)}$=12%), and the threshold rate of return is 2.5% (that is, $R_{THRESH}$=2.5%). The return to the Growth Component was sufficient to cover the threshold amount 4 times over (because 10%/2.5%=4), allowing for the addition of 4 steps to the ladder. The ladder cannot be increased beyond 6 steps because adding more than six 6-month steps to a ladder with four 6-month steps in it already would cause it to have more than the maximum of 10 steps in it. Hence, 4 steps will be added to the ladder (that is, Min(6, 4)=4).

In another example, suppose the investment ladder currently has steps in intervals of 6 months (that is, Z=6 months), 2 years of withdrawals in it and therefore four 6-month steps (that is, S=4), the return to the Growth Component over the past 6 months was 10% (that is, $R_{(t1)}$=10%), the return to the Growth Component over the past 12 months was 2.5% (that is, $R_{(t2)}$=2.5%), and the threshold rate of return is 2.5% (that is, $R_{THRESH}$=2.5%). Because $R_{(t1)} > R_{(t2)}$ the return to the Growth Component was sufficient to cover the threshold amount between one and four times over (because 2.5%/2.5%=1 but 10%/2.5%=4). This allows the addition of between 1 and 4 steps to the ladder, and the choice could depend on expectations of future market performance and the extent to which more income protection is currently desired, given the cost of providing it (selling more of the Growth Component and foregoing potential earnings on it). The investment ladder cannot be increased beyond 6 steps because adding more than six 6-month steps to a ladder with four 6-month steps would cause it to have more than 10 steps in it, more than the maximum. Hence, between 1 and 4 steps will be added to the ladder.

In another example, suppose the investment ladder currently has steps in intervals of 6 months (that is, Z=6 months), 4 years of withdrawals in it (that is, S=8), the return to the Growth Component over the past 6 months was 10% (that is, $R_{(t1)}$=10%), the return to the Growth Component over the past 12 months was 12% (that is, $R_{(t2)}$=12%), and the threshold rate of return is 2.5% (that is, $R_{THRESH}$=2.5%). The return to the Growth Component was sufficient to cover the threshold amount 4 times over (because 10%/2.5%=4), allowing for the addition of 4 steps to the investment ladder. The investment ladder cannot be increased beyond 2 steps because adding more than two 6-month steps to a ladder with eight 6-month steps in it already would cause it to have more than the maximum of 10 steps in it. Hence, 2 steps will be added to the ladder (that is, Min(2, 4)=2).

In another example, suppose the investment ladder currently has steps in intervals of 6 months (that is, Z=6 months), 6 months of withdrawals in it (that is, S=1), the return to the Growth Component over the past 6 months was 10% (that is, $R_{(r1)}$=10%), the return to the Growth Component over the past 12 months was 12% (that is, $R_{(r2)}$=12%), and the threshold rate of return is 2.5% (that is, $R_{THRESH}$=2.5%). The return to the Growth Component was sufficient to cover the threshold amount 4 times over (because 10%/2.5%=4), allowing for the addition of 4 steps to the investment ladder. The investment ladder cannot be increased beyond 9 steps because adding more than nine 6-month steps to a ladder with one 6-month step in it already would cause it to have more than the maximum of 10 steps in it. Hence, 4 steps will be added to the ladder (that is, Min(9, 4)=4).

In another example, suppose the investment ladder currently has steps in intervals of 6 months (that is, Z=6 months), 6 months of withdrawals in it (that is, S=1), the return to the Growth Component over the past 6 months was −3% (that is, $R_{(r1)}$=−3%). Because the return over 6 months was below 0%, it does not matter what the return over the past 12 months was. The threshold rate of return is 2.5% (that is, $R_{THRESH}$=2.5%). The return to the Growth Component was not sufficient to cover the threshold amount even once (because −3%/2.5%<0), allowing for the addition of no steps to the ladder without digging into principal in the Growth Component. Nevertheless, because the investment ladder is down to 6 months of withdrawals (1 step), and the minimum number of steps after replenishing the ladder is 2 steps ($S_{MIN}$=2) the Growth Component will be harvested to add a single step to the investment ladder.

In another example, suppose the investment ladder currently has steps in intervals of 6 months (that is, Z=6 months), 6 months of withdrawals in it (that is, S=1), the return to the Growth Component over the past 6 months was 6% (that is, $R_{(r1)}$=6%), the return to the Growth Component over the past 12 months was −5% (that is, $R_{(r2)}$=−5%) and the threshold rate of return is 2.5% (that is, $R_{THRESH}$=2.5%). The return to the Growth Component over the past 6 months was sufficient to cover the addition of 2 steps to the investment ladder (because 6%/2.5%=2.4, the largest integer of which is 2), but because the Growth Component is down 5% over the past 12 months, adding to the investment ladder now would require digging into the Growth Component principal compared to 12 months ago. Nevertheless, because the investment ladder is down to 6 months of withdrawals (1 step), the Growth Component will be harvested to add a single step to the investment ladder.

As mentioned above, investors may elect not to receive any distributions in some embodiments of the invention. In these cases, a selected amount of the investor's assets may be invested in a fixed income security ladder. As the Growth Component increases in value as described above, additional steps are added to the ladder in the same manner as described above with respect to investors who do take distributions. However, because no funds invested in the Income Protection Component are ever paid out as distributions, the size or number of steps in the Income Protection Component never shrinks and instead grows to its maximum size or step level where it stays thereafter.

The above-described embodiments and other possible embodiments of the invention provide an investor a regular and predicable income stream while maximizing the potential for asset growth by investing a portion of the investor's assets in a relatively conservative Income Protection Component for paying monthly or other periodic distributions and a portion in a relatively more aggressive Growth Component for possible asset growth. Because more assets from the Growth Component are sold to replenish the Income Protection Component when the rate of return of the Growth Component is high and fewer or no assets are sold when the rate of return of the Growth Component is low or negative, the Growth Component is less likely to become depleted over time. Embodiments of the invention may also implement a flexible fixed-income ladder in the Income Protection Component that grows or shrinks depending on market conditions and rates of return, with the goal of minimizing the likelihood that assets from the Growth Component will need to be sold at a loss.

Although the invention has been described with reference to the preferred embodiment illustrated in the attached drawing figures, it is noted that equivalents may be employed and substitutions made herein without departing from the scope of the invention as recited in the claims. For example, the particular rules and algorithms described and illustrated herein are examples only and may be modified and/or replaced with other rules and algorithms.

Having thus described the preferred embodiment of the invention, what is claimed as new and desired to be protected by Letters Patent includes the following:

1. A computer-implemented method of providing distributions to an investor, the computer-implemented method comprising:
   receiving, in a computer that has been programmed to perform steps of the method, data representative of assets owned by an investor;
   designating at least some of the assets as being Growth Component assets;
   designating at least some of the assets as being Income Protection Component assets;
   investing assets in the Growth Component primarily in growth-oriented investments;
   investing assets in the Income Protection Component into one or both of an amount of fixed term assets or money market mutual fund holdings to create an income-producing ladder with a selected number of steps with selected maturity intervals;
   periodically paying the investor a distribution from the Income Protection Component;
   receiving in the computer data representative of growth of the assets in the Growth Component over a period of time;
   calculating with the computer an amount, if any, the growth of the assets in the Growth Component has exceeded a threshold amount;
   determining with the computer one or both of an amount of additional fixed term assets or money market mutual fund holdings that should be purchased for the Income Protection Component based at least partially on the growth of the assets in the Growth Component; and
   receiving data in the computer representative of a state of the Income Protection Component; comparing the state of the Income Protection Component to a threshold state level; and if the state of the Income Protection Component is less than or equal to the threshold state level, determining that at least one additional fixed term security should be purchased for the Income Protection Component regardless of the growth of the assets in the Growth Component.

2. A computer-implemented method of providing distributions to an investor, the computer-implemented method comprising:

receiving, in a computer that has been programmed to perform steps of the method, data representative of assets owned by an investor;

designating at least some of the assets as being Growth Component assets;

designating at least some of the assets as being Income Protection Component assets;

investing assets in the Growth Component primarily in growth-oriented investments;

investing assets in the Income Protection Component into one or both of an amount of fixed term assets or money market mutual fund holdings to create an income-producing ladder with a selected number of steps with selected maturity intervals;

periodically paying the investor a distribution from the Income Protection Component;

receiving in the computer data representative of growth of the assets in the Growth Component over a period of time;

calculating with the computer an amount, if any, the growth of the assets in the Growth Component has exceeded a threshold amount;

determining with the computer one or both of an amount of additional fixed term assets or money market mutual fund holdings that should be purchased for the Income Protection Component based at least partially on the growth of the assets in the Growth Component; and receiving data in the computer representative of a state of the Income Protection Component; comparing the state of the Income Protection Component to a maximum threshold state level; and if the state of the Income Protection Component is greater than or equal to the maximum threshold state level, determining that no additional fixed term securities should be purchased for the Income Protection Component.

3. The method as set forth in claim 1, wherein the growth-oriented investments of the Growth Component are primarily mutual funds that invest in domestic and foreign stocks, bonds, and other securities.

4. The method as set forth in claim 1, wherein the income-oriented investments of the Income Protection Component are primarily individual fixed-income securities, money market mutual funds, bank certificates of deposit, and other income-oriented assets.

5. The method as set forth in claim 1, wherein the distribution is paid in the form of a monthly or other periodic check or electronic transfer of a fixed dollar amount.

6. The method as set forth in claim 1, wherein the distribution is a fixed or variable amount including zero.

7. A tangible non-transitory computer executable storage medium having computer executable program code stored thereon for use in providing investment services, the computer executable program code comprising:

a code segment for receiving data representative of the state of assets in an Income Protection Component;

a code segment for receiving data representative of a growth of assets in a Growth Component;

a code segment for calculating an amount of assets to be sold from the Growth Component to replenish or extend the Income Protection Component when the state of the Income Protection Component drops below a threshold state level, wherein the code segment calls for a relatively greater amount of assets to be sold from the Growth Component when the assets in the Growth Component have increased by more than a threshold amount and a relatively lesser amount of assets to be sold from the Growth Component when the assets in the Growth Component have not increased more than the threshold amount; and a code segment for determining that one or both of an amount of additional fixed term assets or money market mutual fund holdings should be purchased for the Income Protection Component if the state of the Income Protection Component is less than or equal to another threshold state level.

8. The computer-readable medium of claim 7, the computer program further comprising:

a code segment for calculating an amount of assets to be sold from the Growth Component to replenish the Income Protection Component even when the state of the Income Protection Component is above the threshold state level when the growth of the assets in the Growth Component has increased by more than a threshold rate.

9. A tangible non-transitory computer executable storage medium having computer executable program code stored thereon for use in providing investment services, the computer executable program code comprising:

a code segment for receiving data representative of the state of assets in an Income Protection Component;

a code segment for receiving data representative of growth of assets in a Growth Component;

a code segment for calculating an amount of assets to be sold from the Growth Component to replenish the Income Protection Component when the state of the Income Protection Component drops below a threshold state level, wherein the code segment calls for a relatively greater amount of assets to be sold from the Growth Component when the assets in the Growth Component have increased by more than a threshold amount and a relatively lesser amount of assets to be sold from the Growth Component when the assets in the Growth Component have not increased more than the threshold amount; and a code segment for determining that no additional fixed term securities should be purchased for the Income Protection Component if the state of the Income Protection Component is greater than or equal to a maximum threshold state level.

* * * * *